United States Patent
Wang et al.

(10) Patent No.: US 8,238,976 B2
(45) Date of Patent: Aug. 7, 2012

(54) BASE STATION ARRANGEMENT FOR A CELLULAR COMMUNICATION SYSTEM

(75) Inventors: Jing Wang, Swindon (GB); Conroy L. Brown, Swindon (GB); Jeffrey Hebden, London (GB); Olatunde O. Williams, London (GB)

(73) Assignee: Motorola Mobility LLC, Libertyville, IL (US)

( * ) Notice: Subject to any disclaimer, the term of this patent is extended or adjusted under 35 U.S.C. 154(b) by 266 days.

(21) Appl. No.: 12/663,974

(22) PCT Filed: Jul. 22, 2008

(86) PCT No.: PCT/US2008/070708
§ 371 (c)(1),
(2), (4) Date: Dec. 10, 2009

(87) PCT Pub. No.: WO2009/020758
PCT Pub. Date: Feb. 12, 2009

(65) Prior Publication Data
US 2010/0222106 A1      Sep. 2, 2010

(30) Foreign Application Priority Data
Aug. 7, 2007    (GB) .................................. 0715292.9

(51) Int. Cl.
H04M 1/00 (2006.01)
H04B 1/46 (2006.01)
(52) U.S. Cl. ..................... 455/562.1; 455/82; 455/444
(58) Field of Classification Search .................. 455/403, 455/444, 447, 448, 450, 452.1, 562.1, 561, 455/82, 277.1, 525; 342/373, 374
See application file for complete search history.

(56) References Cited

U.S. PATENT DOCUMENTS

| | | | | |
|---|---|---|---|---|
| 5,565,873 A | | 10/1996 | Dean | |
| 5,570,098 A | * | 10/1996 | Searle et al. | 342/374 |
| 5,576,717 A | * | 11/1996 | Searle et al. | 342/373 |
| 5,602,555 A | * | 2/1997 | Searle et al. | 342/374 |
| 5,666,123 A | * | 9/1997 | Chrystie | 342/373 |

(Continued)

FOREIGN PATENT DOCUMENTS
GB   2281010 A   2/1995
(Continued)

OTHER PUBLICATIONS
Mrs. Emma Porter: Combined Search and Examination Report under Sections 17 and 18(3), date of report: Nov. 29, 2007, all pages.

*Primary Examiner* — Sonny Trinh (57) ABSTRACT

A base station arrangement for a cellular communication system comprises a plurality of antennas (101-105) where each antenna (101-105) has a different coverage area. The base station arrangement can operate in a sectorised mode and a non-sectorised mode controlled by a mode controller (119). When in the sectorised mode, the base station arrangement provides an individual broadcast control carrier to each antenna (101-105) of the plurality of antennas (101-105) thereby supporting a plurality of cells each having a coverage area of the corresponding antenna (101-105). When in the non-sectorised mode, the base station arrangement provides a common broadcast carrier to all antennas (101-105) of the plurality of antennas (101-105) thereby supporting a single cell having a coverage area corresponding to a combined coverage area of the plurality of antennas (101-105). The invention may allow reduced power consumption at low loading without sacrificing peak capacity.

17 Claims, 4 Drawing Sheets

U.S. PATENT DOCUMENTS

| | | | |
|---|---|---|---|
| 6,141,566 A | 10/2000 | Gerdisch et al. | |
| 6,188,873 B1 * | 2/2001 | Wickman et al. | 455/11.1 |
| 6,970,709 B1 * | 11/2005 | Williams | 455/452.1 |
| 7,062,246 B2 * | 6/2006 | Owen | 455/277.1 |
| 7,573,851 B2 * | 8/2009 | Xing et al. | 370/334 |
| 7,944,919 B2 * | 5/2011 | Connors et al. | 370/390 |
| 8,041,395 B2 * | 10/2011 | Lo et al. | 455/562.1 |
| 8,064,444 B2 * | 11/2011 | Connors et al. | 370/390 |
| 2003/0199269 A1 | 10/2003 | Tobe et al. | |
| 2004/0043764 A1 | 3/2004 | Bigham et al. | |

FOREIGN PATENT DOCUMENTS

| | | |
|---|---|---|
| GB | 2281176 A | 2/1995 |

\* cited by examiner

BASE STATION ARRANGEMENT FOR A CELLULAR COMMUNICATION SYSTEM

FIELD OF THE INVENTION

The invention relates to a base station arrangement for a cellular communication system and in particular, but not exclusively, for a Global System for Mobile communication (GSM).

BACKGROUND OF THE INVENTION

In cellular communication systems, the optimisation of the use of the limited spectrum resource is one of the most critical network management operations. In cellular communication systems, such as GSM, the geographical area is divided into individual cells thereby allowing reuse of carrier frequencies in different cells sufficiently removed from each other for the co-channel interference to be reduced to acceptable levels. In order, to use the resource efficiently, complex frequency planning operations are performed to allocate frequencies to the individual cells.

An approach which is frequently used to improve frequency reuse in cellular communication systems is to introduce sectorised cells wherein a given base station site effectively supports a plurality of cells through the use of directional antennas. For example, for a given base station site, three sectors may be generated by using three directional antennas angled in different directions (i.e. offset by 120° with respect to each other). Such sectorisation may reduce interference and allow for tighter frequency reuse thereby increasing the overall network capacity.

Capacity and frequency planning is generally based on marginal conditions when the system is operating close to the capacity limit. Indeed, it is generally the object of the frequency planning exercise to optimise performance at the capacity limit in order to maximise the capacity of the system. However, a disadvantage of such an approach is that it may not lead to optimal performance when the system is not operating close to the capacity limit. In particular, the resulting operation tends to be over dimensioned for normal operation during lower loadings. This tends to result in inefficient use of resources at lower loadings and may for example result in increased power consumption and/or interference.

Hence, an improved system would be advantageous and in particular a system allowing increased flexibility, high capacity, reduced power consumption, reduced resource usage and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a base station arrangement for a cellular communication system, the base station arrangement comprising: a plurality of antennas with each antenna of the plurality of antennas having a different coverage area; base station means operable to operate in a sectorised mode and a non-sectorised mode; and switching means for switching the base station means between the sectorised mode and the non-sectorised mode; wherein the base station means is arranged to provide an individual broadcast control carrier to each antenna of the plurality of antennas when in the sectorised mode thereby supporting a plurality of cells each having a coverage area of a corresponding antenna of the plurality of antennas; and to provide a common broadcast carrier to all antennas of the plurality of antennas when in the non-sectorised mode thereby supporting a single cell having a coverage area corresponding to a combined coverage area of the plurality of antennas.

The inventors of the current invention have realised that it may be advantageous to dynamically switch between sectorised and non-sectorised operation depending on the current conditions in the cellular communication system.

The invention may provide improved operation and/or performance in a cellular communication system. The operation may be adapted to current conditions. In particular, reduced power consumption may be achieved without reducing communication capacity of the system. Thus, reduced power consumption can be achieved during non-peak loading scenarios while providing maximum capacity during peak loading scenarios. A simple implementation may be achieved. In particular, existing base station equipment using sectorised coverage may easily be modified to include the principles of the current invention.

In accordance with an optional feature of the invention, the switching means is arranged to switch between the sectorised mode and the non-sectorised mode in response to a current time.

This may allow a simple yet efficient adaptation of the operation of the base station arrangement to the current conditions in the cellular communication system. For example, based on a statistical evaluation of the previous load conditions in the cellular communication system, predetermined time instants for the base station means to switch mode may be defined. Thus, the switching means may include a local clock which determines the current time and whenever this coincides with a predetermined switching time instant the switching means may proceed to switch the base station means from one mode of operation to the other. The current time may specifically include a consideration of a time of day, time of week, time of month and/or time of year.

In accordance with an optional feature of the invention, the switching means is arranged to switch between the sectorised mode and the non-sectorised mode in response to a loading of the base station arrangement.

This may allow a flexible, efficient and/or high performance adaptation of the operation of the base station arrangement to the current conditions in the cellular communication system. Specifically, the loading of one or more of the plurality of cells and/or of the single cell may be compared to a predetermined threshold and the switching means may switch the mode of operation when the threshold is reached. For example, when operating in the sectorised mode, the switching means may switch the base station means to the non-sectorised mode if the combined loading of the plurality of cells drops below a first threshold. When operating in the non-sectorised mode, the switching means may e.g. switch the base station means to the sectorised mode if the loading of the single cells exceeds a second threshold. The first and second thresholds are design parameters which e.g. may be determined based on the resource associated with each antenna of the plurality of antenna elements. The thresholds may furthermore be dynamically modified in response to measured operational parameters of the cellular communication system.

In accordance with another aspect of the invention, there is provided a cellular communication system comprising a base station arrangement, the base station arrangement comprising: a plurality of antennas with each antenna of the plurality of antennas having a different coverage area; base station means operable to operate in a sectorised mode and a non-sectorised mode; and switching means for switching the base station means between the sectorised mode and the non-sectorised mode; wherein the base station means is arranged to provide an individual broadcast control carrier to each antenna of the plurality of antennas when in the sectorised mode thereby supporting a plurality of cells each having a coverage area of a corresponding antenna of the plurality of antennas; and to provide a common broadcast carrier to all antennas of the plurality of antennas when in the non-sectorised mode thereby supporting a single cell having a coverage area corresponding to a combined coverage area of the plurality of antennas.

In accordance with another aspect of the invention, there is provided a method of operation for a base station arrangement of a cellular communication system, the base station arrangement comprising a plurality of antennas with each antenna having a different coverage area, the method comprising: operating in a sectorised mode wherein an individual broadcast control carrier is provided to each antenna of the plurality of antennas thereby supporting a plurality of cells each having a coverage area of a corresponding antenna of the plurality of antennas; operating in a non-sectorised mode wherein a common broadcast carrier is provided to all antennas of the plurality of antennas thereby supporting a single cell having a coverage area corresponding to a combined coverage area of the plurality of antennas; and switching between the sectorised mode and the non-sectorised mode.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a GSM cellular communication system. However, it will be appreciated that the invention is not limited to this application but may be applied in many other cellular communication systems.

Figure 1:
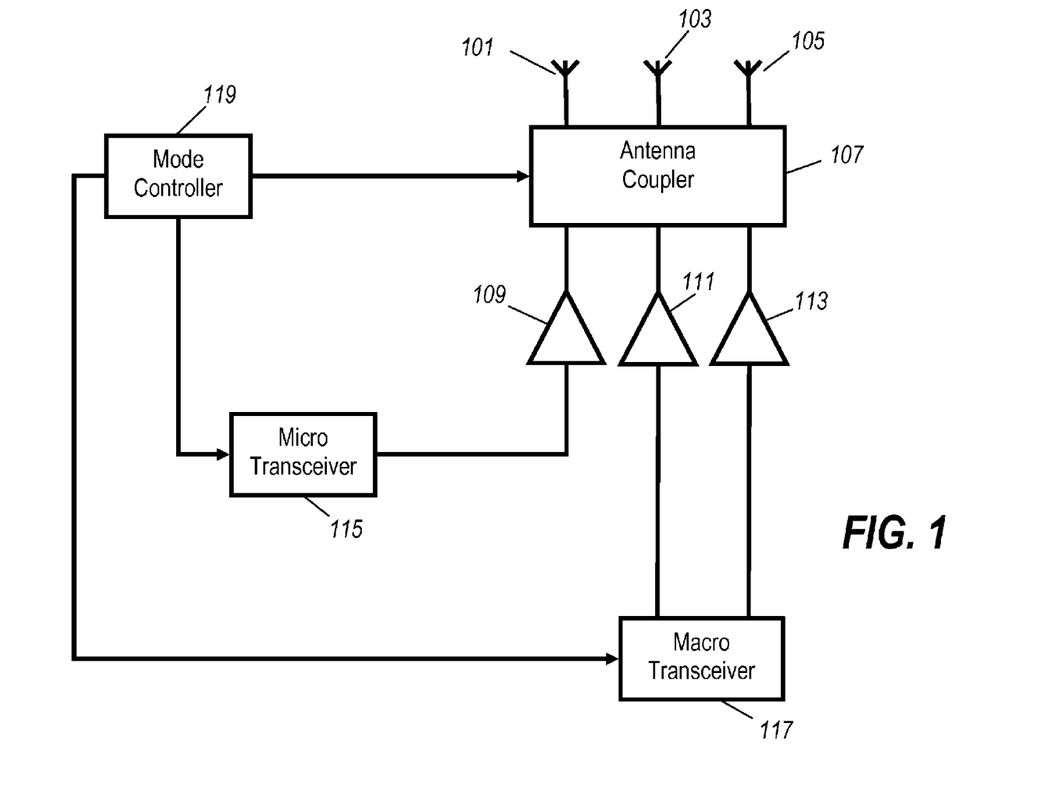
FIG. 1 illustrates an example of a base station arrangement in accordance with some embodiments of the invention.

FIG. 1 illustrates an example of a base station arrangement in accordance with some embodiments of the invention.

The base station arrangement comprises three antennas 101-105 (it will be appreciated that in other embodiments other numbers of antennas may be employed). The three antennas 101-105 are co-located directional antennas which are offset by approximately 120° with respect to each other. The beamwidth of each antenna is in the example around 120°-150° such that a relatively small overlap exists between the different coverage areas. Thus, the antennas 101-105 together support cellular communications in an omni-directional coverage area having the base station arrangement in the centre with each of the antennas 101-105 supporting an individual coverage area corresponding to a sector of the omni-directional cell.

The antennas 101-105 are coupled to an antenna coupler 107 which is further coupled to three amplifiers 109-113. In the following, the principles will be described with respect to downlink transmissions (i.e. where signals are transmitted from the base station) and the three amplifiers 109-113 will specifically be described as power amplifiers being part of the transmit path of the base station arrangement. However, it will be appreciated that the principles of the described operation also applies to uplink communications and thus that the illustrated amplifiers 109-113 can also be considered to comprise low noise amplifiers being part of the receive path of the base station arrangement.

The antenna coupler 107 comprises functionality for coupling the individual amplifier 109-113 to the individual antennas 101-105 as will be described in the following. As a specific example the antenna coupler may be a Radio Frequency (RF) switch matrix.

The antenna coupler 107 is coupled to a first transceiver which in the example is a micro base station transceiver 115 comprising functionality for supporting communications within a cell. In the example, the micro transceiver 115 is capable of supporting at least one broadcast control carrier in the form of a GSM Broadcast Control CHannel BCCH carrier. In addition, the micro transceiver 115 may be capable of supporting one or more traffic carriers.

The antenna coupler 107 is furthermore coupled to a second transceiver which in the example is a macro base station transceiver 117 comprising functionality for supporting communications within a cell. The macro transceiver 117 comprises two transceivers with individual antenna connectors. Thus the macro transceiver 117 is coupled to two amplifiers 111, 113.

In the example, the macro transceiver 117 is in one configuration capable of supporting at least two broadcast control carriers in the form of GSM Broadcast Control CHannel BCCH carriers (one for each antenna connection). In addition, when in this configuration, the macro transceiver 117 may be capable of supporting one or more traffic carriers. In another configuration, the macro transceiver 117 can support at least two traffic carriers. Thus, as a minimum the macro transceiver 117 can support two carriers which are configurable as traffic carriers or BCCH carriers.

It will be appreciated that although the antenna coupler 107 in the described arrangement is located between the amplifiers 109-113 and the antennas 101-105, the antenna coupler 107 may be functionally located elsewhere. For example, the antenna coupler 107 may be located between the amplifiers 109-113 and the macro transceiver 117 and micro transceiver 115 or may be distributed with some functionality being between the amplifiers 109-113 and the antennas 101-105 and other functionality being between the amplifiers 109-113 and the macro transceiver 117 and micro transceiver 115.

The base station arrangement is operable to operate in different modes and comprises a mode controller 119 which is operable to switch the base station arrangement between the different modes.

Specifically, the base station arrangement can operate in a first mode of operation which is a sectorised mode and in a second mode of operation which is a non-sectorised mode of operation. In the sectorised mode of operation an individual broadcast control carrier is provided to each antenna 101-105. Thus, each antenna 101-105 transmits its own BCCH and thus effectively operates as an independent cell covering an area corresponding to the coverage area of the antenna 101-

105. Thus, in this mode of operation, the base station arrangement effectively supports a plurality of cells with each cell having a coverage area of the corresponding antenna.

When operating in the non-sectorised mode of operation, a common broadcast carrier is provided to all of the antennas 101-105. Thus, in this mode of operation each antenna 101-105 transmits the same BCCH and the base station arrangement effectively supports only a single cell corresponding to the common BCCH. However, the coverage area of this cell corresponds to the combined coverage area of all of the antennas 101-105. In particular, in the example where three directional antennas offset by 120° and with beamwidths of more than 120° are used, a substantially omni-directional cell can be obtained.

In the example, the base station arrangement operates in the sectorised mode during times of high loading and in the non-sectorised omni-directional mode during times of low loading. In a simple embodiment, the mode controller 119 comprises an internal clock which determines the current time. In addition, a number of switching time instants can be manually stored in the mode controller 119 and when the mode controller 119 detects that a switching time instant has been reached, it transmits a control signal to the antenna coupler 107, the micro transceiver 115 and the macro transceiver 117 causing these to switch from one mode of operation to another. Thus, in this embodiment the mode controller 119 is arranged to switch between the sectorised mode and the non-sectorised mode in response to a current time which may include consideration of e.g. a current time of the day, week, month and/or year.

The switching time instants may be manually determined from a manual analysis of the previous operation of the network. For example, the average loading of the base station arrangement can be determined from stored measurements and used to determine when peak times occur. As a specific example for a base station arrangement supporting a main commuter area, the analysis may reveal that a loading above a given level is encountered from 7AM to 10AM and from 4PM to 7PM during working days. Thus, the mode controller 119 can control the base station arrangement such that sectorised mode is applied every workday in the time intervals of 7AM to 10AM and 4PM to 7PM and such that non-sectorised mode is used at all other times. Thus, the base station arrangement operates in sectorised mode during peak hours and in non-sectorised omni-directional mode during off-peak hours thereby providing high capacity when this is particularly required while reducing resource consumption when the additional capacity is not necessary.

Figure 2:
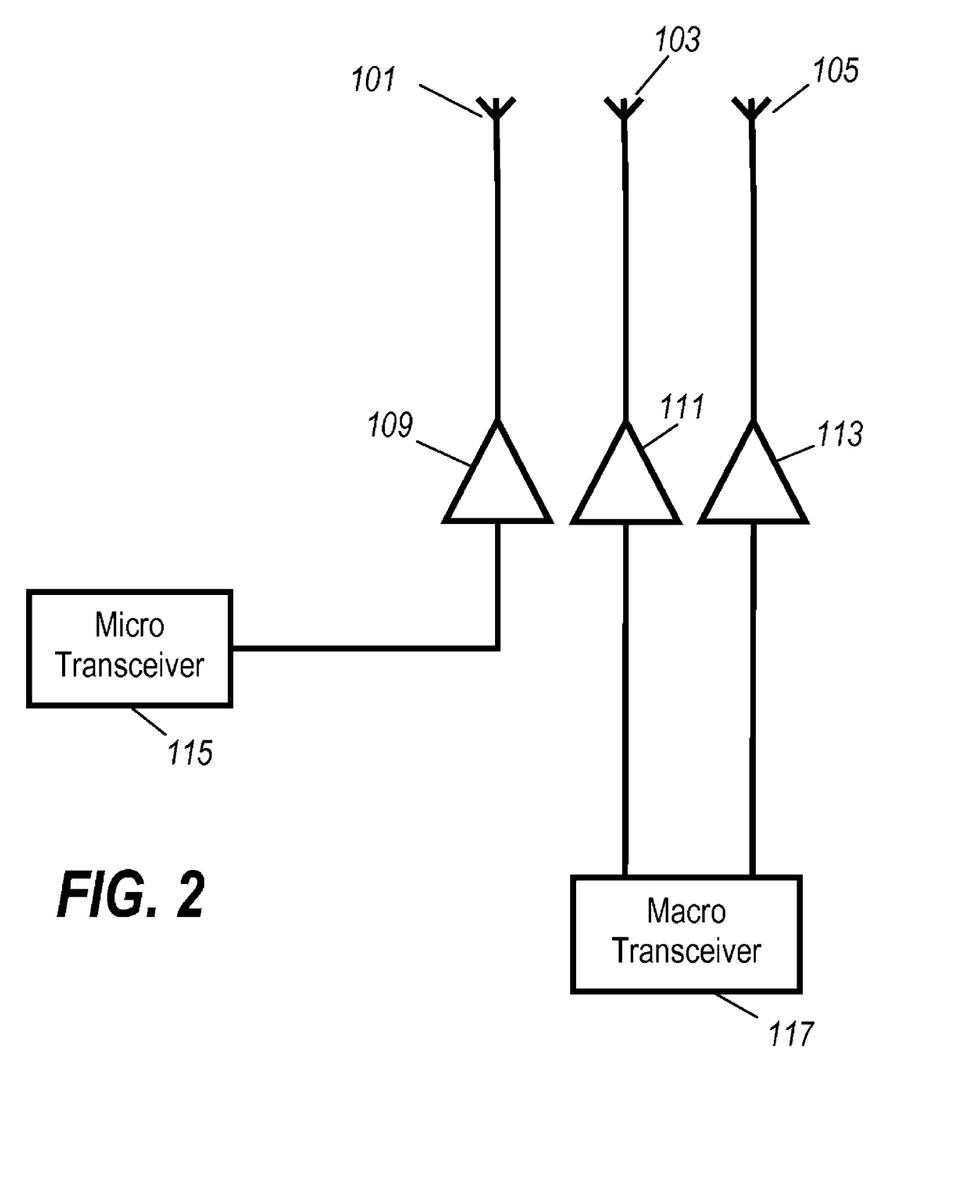
FIG. 2 illustrates an example of a base station arrangement operating in a sectorised mode in accordance with some embodiments of the invention.

In the base station arrangement of FIG. 1, two transceivers are used to provide the desired operation. In the example, the micro transceiver 115 supports at least one carrier whereas the macro transceiver 117 supports at least two carriers. In the sectorised mode, the micro transceiver 115 is coupled directly to one of the antennas 101 whereas the macro transceiver 117 provides two connections each of which is coupled to an individual antenna 103, 105 as illustrated in FIG. 2.

Thus, in the sectorised mode, the micro transceiver 115 is coupled only to a first antenna 101 which transmits a first BCCH carrier generated by the micro transceiver 115. Thus, the micro transceiver 115 and the first antenna effectively support a first sector cell formed by the coverage area of the first antenna. Furthermore, the macro transceiver 117 generates a second BCCH carrier which is fed only to the second amplifier 111 and the second antenna 103. Thus, the macro transceiver 117 and the second antenna 103 effectively support a second sector cell formed by the coverage area of the second antenna 103. The macro transceiver 117 also generates a third BCCH carrier which is fed only to the third amplifier 113 and the third antenna 105. Thus, the macro transceiver 117 and the third antenna 105 effectively support a third sector cell formed by the coverage area of the third antenna 105. The first, second and third BCCH are different such that the base station arrangement effectively supports three sector cells each having a coverage area around a third of the coverage area of the omni-directional cell.

Figure 3:
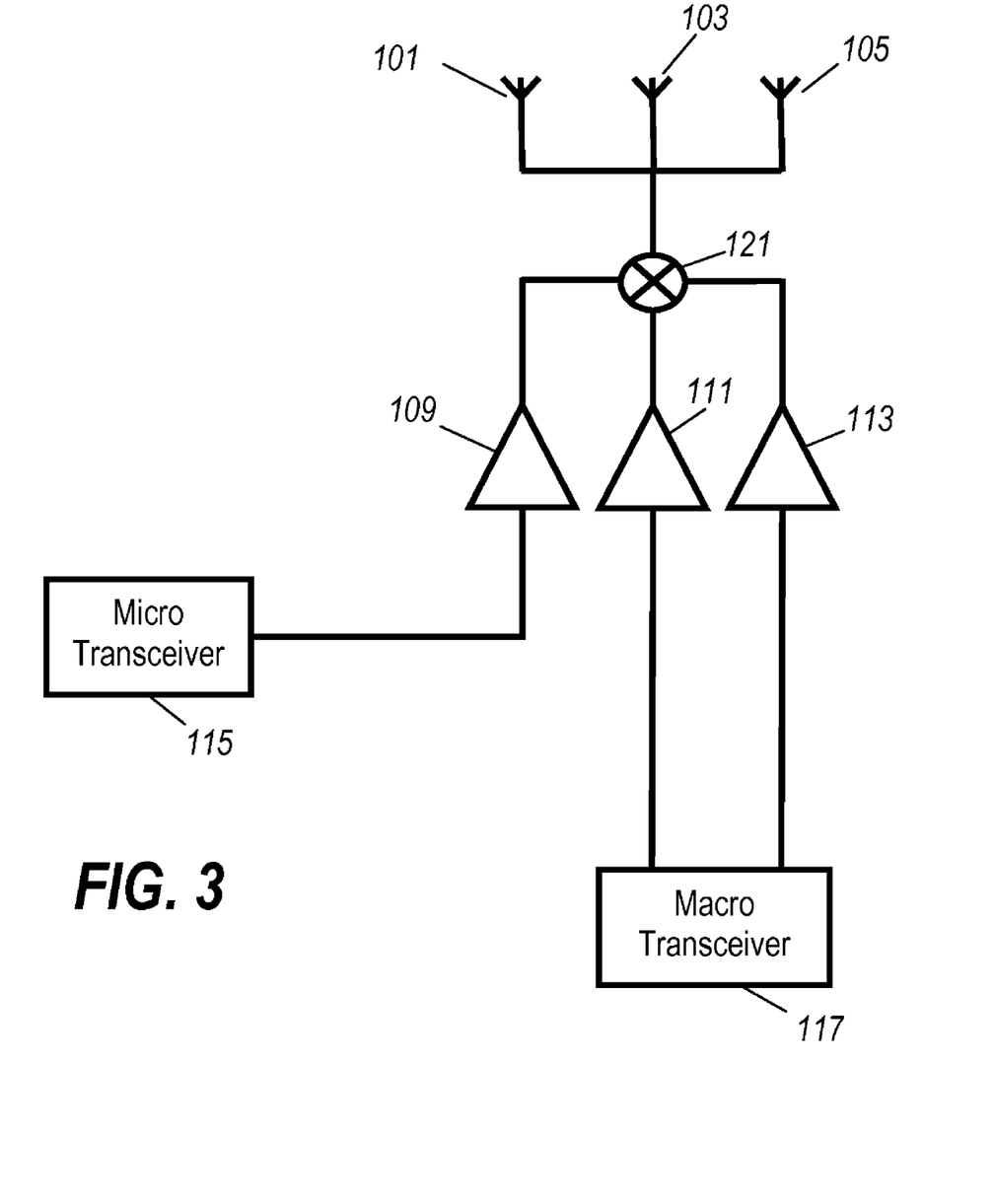
FIG. 3 illustrates an example of a base station arrangement operating in a non-sectorised mode in accordance with some embodiments of the invention.

FIG. 3 illustrates the operation in the non-sectorised mode. In the example, the antenna coupler 107 comprises a combiner 121 which combines the output signals from the three amplifiers 109-113 and thus from the micro transceiver 115 and macro transceiver 117 before feeding the combined signal to all three antennas 101-105. Furthermore, the macro transceiver 117 is reconfigured such that it does not generate any BCCH. Thus, the only transmitted BCCH signal is that generated by the micro transceiver 115 which is transmitted by all three antennas 101-105 resulting in the base station arrangement effectively supporting a single omni-directional non-sectorised cell.

It will be appreciated that the same approach may be used in the receive paths. Specifically, in the sectorised mode, the antenna coupler 107 may directly connect each antenna with one receive amplifier whereas in the non-sectorised mode the antenna coupler 107 may feed the signals of all antennas 101-105 to all receive amplifiers (e.g. using a splitter).

In some embodiments, the omni-directional cell may only be supported by the micro transceiver 115, and the macro transceiver 117 may be switched to stand by during the non-sectorised mode. However, in other embodiments, the macro transceiver 117 may e.g. be reconfigured such that the functionality used to support the individual BCCH carriers in the sectorised mode are used to provide traffic carriers when in the non-sectorised mode. Thus, the macro transceiver 117 may be arranged to support at least one traffic carrier when in the non-sectorised mode.

In such embodiments, a concentric cell algorithm may be applied such that at least one of the traffic carriers is arranged to support a reduced coverage area within the coverage area supported by the BCCH carrier. Thus, the micro transceiver 115 can support an outer zone and the macro transceiver 117 an inner zone of a concentric cell arrangement.

The described approach allows the base station arrangement to be adapted to the current conditions in the cellular communication system. In particular, it may reduce resource usage without sacrificing peak capacity performance. E.g. the non sectorised omni-directorial mode can provide a reduction in the power consumption of the base station arrangement by requiring that only one BCCH is transmitted for the site. This can be achieved without affecting the coverage area supported by the base station arrangement which can be maintained the same in the sectorised and non-sectorised modes.

In some embodiments, the micro transceiver 115 is located proximally to the antennas 101-105 whereas the macro transceiver 117 is located remotely from the antennas 101-105. Specifically, the micro transceiver 115 can be implemented with a small form factor suitable for mounting at the top of an antenna tower supporting the antennas 101-105 whereas the macro transceiver 117 may be located on the ground which is more practical for more complex equipment with higher form factors. This may reduce e.g. cable loss for the micro transceiver 115 transmitting the BCCH in non-sectorised mode while providing easy access to the typically higher complexity of the macro transceiver 117.

In some embodiments, the mode controller 119 is arranged to dynamically measure indications of the current conditions in the cellular communication system and to switch the mode of operation accordingly.

Specifically, in some embodiments, the mode controller 119 monitors the loading in the system and uses this to determine whether to switch between the sectorised and non-sectorised mode. In some embodiments, the loading of the omni-directional cell may be monitored when the base station arrangement is operating in the non-sectorised mode. If the current loading rises above a given threshold, the mode controller 119 can generate the control signals that cause the base station arrangement to switch to the sectorised mode.

For example, in an embodiment where the macro transceiver 117 is switched off during the non-sectorised mode, the mode controller 119 can continuously monitor how many traffic channels are currently allocated to mobile stations of the cellular communication system. If the number of occupied traffic channels rises above, say, 80% of the total number of available traffic channels in the non-sectorised mode, the mode controller 119 may proceed to switch to the sectorised mode wherein the omni-directional cell is divided into three sector cells.

Similarly, when operating in the non-sectorised mode, the mode controller 119 can monitor the loading of the individual sector cells and can determine to switch to the non-sectorised mode if the loading falls sufficiently. For example, the mode controller 119 can measure the number of traffic channels used in each sector and can sum these to derive the total number of traffic channels currently supported by the base station arrangement. If this number falls below a given threshold, the mode controller 119 can switch the base station arrangement to the non-sectorised mode of operation to reduce power consumption. The threshold may for example be set to a sufficiently low value to ensure that the currently active traffic channels can be supported by only the micro transceiver 115. For example, the threshold can be set to, say, 60% of the total number of traffic channels available in the non-sectorised mode.

In some embodiments, the mode controller 119 may additionally or alternatively take into account the loading of other cells when determining whether to switch mode or not. Specifically, the mode controller 119 can consider the loading of a neighbour cell of the base station arrangement. For example, if the loading of neighbour cells increases to a high level it is likely that the future loading of the base station arrangement will also increase. Accordingly, the mode controller 119 may be more likely to switch to the sectorised mode in anticipation of the future increased loading. It will be appreciated that one way the mode controller 119 may take the neighbour cell loading into account is by modifying the thresholds for the loading of the base station arrangement used to switch between the modes in response to the loading of one or more neighbour cells.

In many embodiments, different frequency plans may be derived for the base station arrangement operating in the sectorised and non-sectorised modes. In such frequency plans, the carrier frequencies used for the BCCH carrier and/or the traffic carrier(s) by the base station arrangement may be different in the two modes.

For example, when in the non-sectorised mode, a given frequency may be used as the BCCH frequency but when switching to the non-sectorised mode this frequency may be switched to another frequency. This may allow independent optimisation of the BCCH frequency plans and reuse for the sectorised and non-sectorised modes.

Similarly, the carrier frequencies used for traffic channels may be different in the sectorised and non-sectorised modes. For example, when switching to the non-sectorised mode a concentric cell arrangement may be applied wherein a given traffic channel carrier may only be used for an inner zone thereby allowing much tighter reuse—e.g. a carrier frequency also used for a neighbour cell can often be used.

In some embodiments, the different frequency plans for the sectorised and non-sectorised mode can additionally or alternatively include a change of the frequencies used in other cells. For example, the cellular system can include a frequency controller which is informed by the base station arrangement when it switches mode. In response, the frequency controller can determine the appropriate frequency plan (e.g. the frequency controller may comprise a manually entered list indicating which frequencies should be used in each cell for the different modes). The frequency controller can then inform the appropriate neighbour base stations of the requirement to change frequency.

Figure 4:
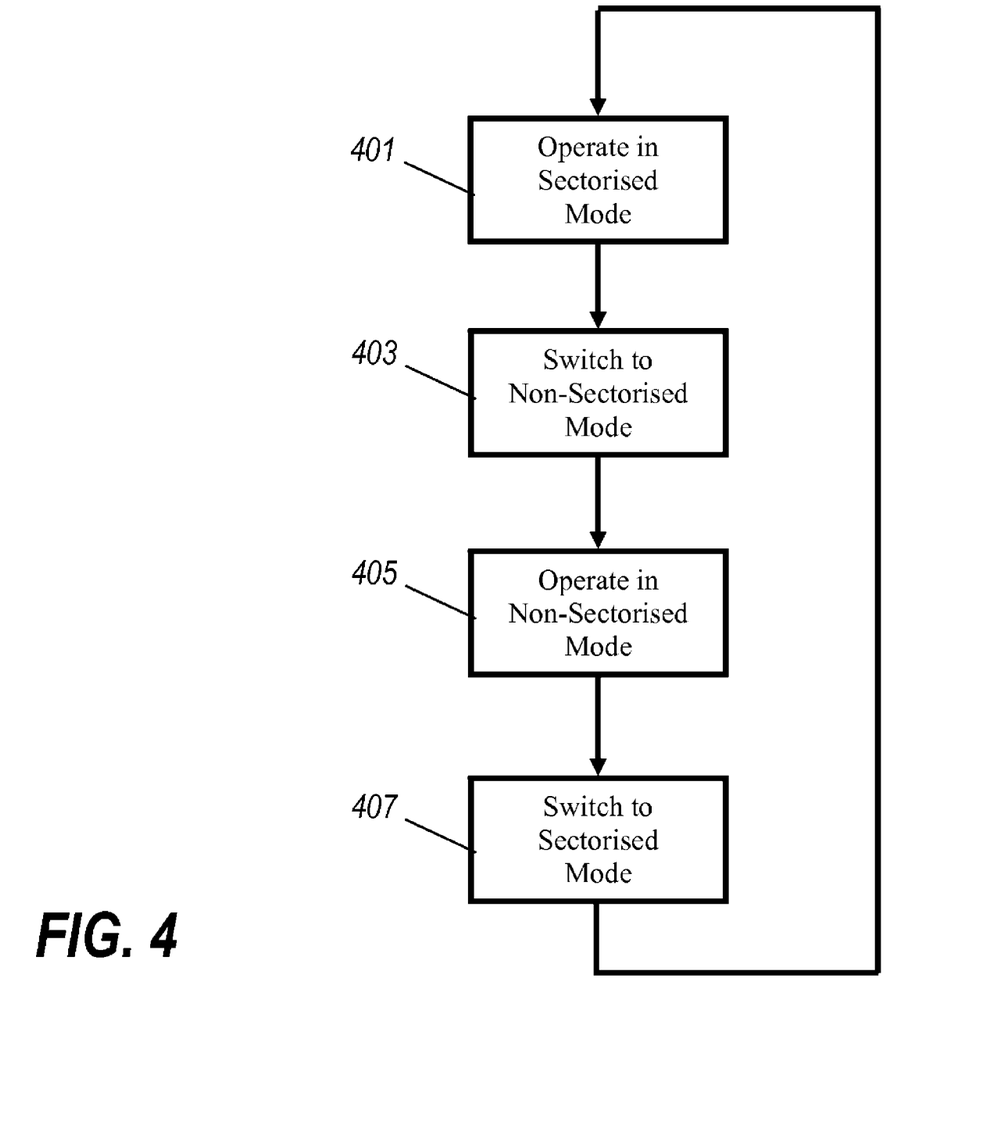
FIG. 4 illustrates an example of a method of operation for a base station arrangement in accordance with some embodiments of the invention.

FIG. 4 illustrates an example of a method of operation for a base station arrangement of a cellular communication system in accordance with some embodiments of the invention. The base station arrangement comprises a plurality of antennas with each antenna having a different coverage area.

The method starts in step 401 wherein the base station arrangement operates in a sectorised mode wherein an individual broadcast control carrier is provided to each antenna of the plurality of antennas in order to support a plurality of cells each having a coverage area of a corresponding antenna of the plurality of antennas.

Step 401 is followed by step 403 wherein the base station arrangement switches to a non-sectorised mode of operation in response to a detection that a suitable switch criterion is met.

Step 403 is followed by step 405 wherein the base station arrangement operates in the non-sectorised mode wherein a common broadcast carrier is provided to all antennas of the plurality of antennas in order to support a single cell having a coverage area corresponding to a combined coverage area of the plurality of antennas.

Step 407 is followed by step 409 wherein the base station arrangement switches to the sectorised mode of operation in response to a detection that a suitable switch criterion is met. The method then returns to step 401.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units.

As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A base station arrangement for a cellular communication system, the base station arrangement comprising:
    a plurality of antennas with each antenna of the plurality of antennas having a different coverage area;
    base station means operable to operate in a sectorised mode and a non-sectorised mode; and
    switching means for switching the base station means between the sectorised mode and the non-sectorised mode; wherein
    the base station means is arranged to provide an individual broadcast control carrier to each antenna of the plurality of antennas when in the sectorised mode thereby supporting a plurality of cells each having a coverage area of a corresponding antenna of the plurality of antennas; and to provide a common broadcast carrier to all antennas of the plurality of antennas when in the non-sectorised mode thereby supporting a single cell having a coverage area corresponding to a combined coverage area of the plurality of antennas.

2. The base station arrangement of claim 1 wherein the switching means is arranged to switch between the sectorised mode and the non-sectorised mode in response to a current time.

3. The base station arrangement of claim 1 wherein the switching means is arranged to switch between the sectorised mode and the non-sectorised mode in response to a loading of the base station arrangement.

4. The base station arrangement of claim 3 wherein the switching means is arranged to switch to the sectorised mode if a loading of the single cell exceeds a threshold.

5. The base station arrangement of claim 3 wherein the switching means is arranged to switch to the non-sectorised mode if a loading of the plurality of cells falls below a threshold.

6. The base station arrangement of claim 1 wherein the switching means is arranged to switch between the sectorised mode and the non-sectorised mode in response to a loading of a neighbour cell for the base station arrangement.

7. The base station arrangement of claim 1 wherein the base station means comprises:
    a first transceiver;
    a second transceiver; and
    coupling means for coupling the first transceiver and the second transceiver to the plurality of antennas; and
    the coupling means is arranged to couple the first transceiver to only a first antenna and the second transceiver to only a second antenna when in the sectorised mode and to couple the first transceiver to both the first antenna and the second antenna and the second transceiver to both the first antenna and the second antenna when in the non-sectorised mode.

8. The base station arrangement of claim 7 wherein the base station means comprises combining means for combining transmit signals from the first transceiver and the second transceiver to generate a combined transmit signal for both the first antenna and the second antenna when in the non-sectorised mode.

9. The base station arrangement of claim 7 wherein both the first and second transceiver is arranged to generate a broadcast control carrier signal for the plurality of antennas when in the sectorised mode and only the first transceiver is arranged to generate a broadcast control carrier signal for the plurality of antennas when in the non-sectorised mode.

10. The base station arrangement of claim 9 wherein the second transceiver is arranged to support at least one traffic carrier when in the non-sectorised mode.

11. The base station arrangement of claim 10 wherein the at least one traffic carrier is arranged to support a reduced coverage area within a coverage area of the broadcast control carrier.

12. The base station arrangement of claim 1 wherein a frequency of the common broadcast carrier is different than any frequency of the individual broadcast control carriers.

13. The base station arrangement of claim 1 wherein the base station means is arranged to use a different carrier frequency for at least one traffic carrier when in the sectorised mode than when in the non-sectorised mode.

14. The base station arrangement of claim 1 wherein each coverage area of each antenna of the plurality of antenna elements is a directional coverage area and the combined coverage area is a substantially omni-directional coverage area.

15. A cellular communication system comprising a base station arrangement, the base station arrangement comprising:
    a plurality of antennas with each antenna of the plurality of antennas having a different coverage area;
    base station means operable to operate in a sectorised mode and a non-sectorised mode; and
    switching means for switching the base station means between the sectorised mode and the non-sectorised mode; wherein
    the base station means is arranged to provide an individual broadcast control carrier to each antenna of the plurality of antennas when in the sectorised mode thereby supporting a plurality of cells each having a coverage area of a corresponding antenna of the plurality of antennas; and to provide a common broadcast carrier to all antennas of the plurality of antennas when in the non-sectorised mode thereby supporting a single cell having a coverage area corresponding to a combined coverage area of the plurality of antennas.

16. The cellular communication system of claim 15 further comprising a frequency controller arranged to modify a carrier frequency of a neighbour cell of the base station arrangement in response to the switching means switching the base station means between the sectorised mode and the non-sectorised mode.

17. A method of operation for a base station arrangement of a cellular communication system, the base station arrangement comprising a plurality of antennas with each antenna having a different coverage area, the method comprising:

operating in a sectorised mode wherein an individual broadcast control carrier is provided to each antenna of the plurality of antennas thereby supporting a plurality of cells each having a coverage area of a corresponding antenna of the plurality of antennas;

operating in a non-sectorised mode wherein a common broadcast carrier is provided to all antennas of the plurality of antennas thereby supporting a single cell having a coverage area corresponding to a combined coverage area of the plurality of antennas; and switching between the sectorised mode and the non-sectorised mode.

* * * * *